No. 818,906. PATENTED APR. 24, 1906.
V. J. O'CONNOR.
MEASURING INSTRUMENT.
APPLICATION FILED AUG. 8, 1905.
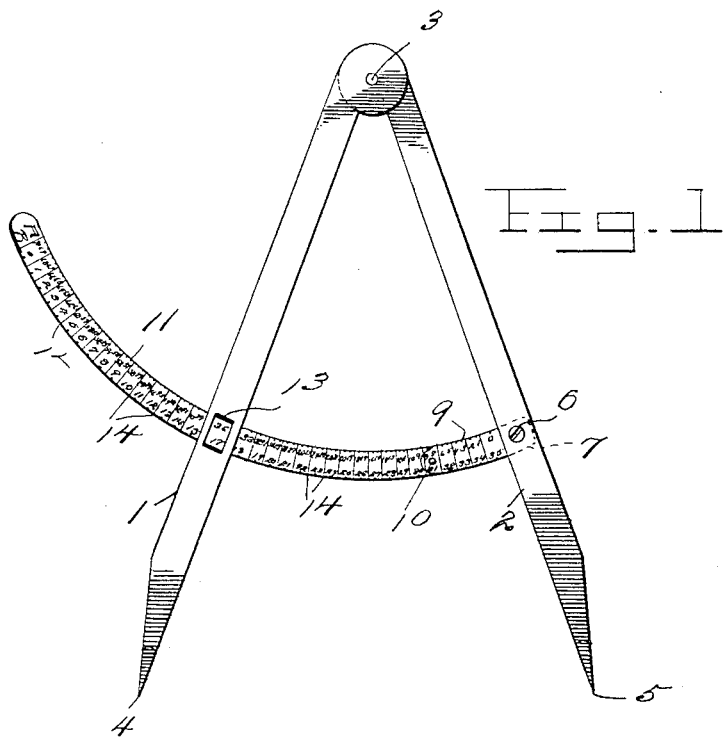
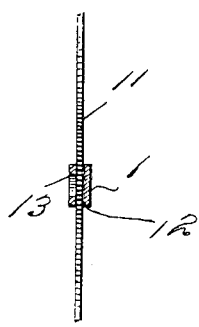
Witnesses
Inventor
V. J. O'Connor
By Chandlee & Chandlee
Attorneys

UNITED STATES PATENT OFFICE.

VICTOR J. O'CONNOR, OF BEND, OREGON.

MEASURING INSTRUMENT.

No. 818,906.  Specification of Letters Patent.  Patented April 24, 1906.

Application filed August 8, 1905. Serial No. 273,295.

*To all whom it may concern:*

Be it known that I, VICTOR J. O'CONNOR, a citizen of the United States, residing at Bend, in the county of Crook, State of Oregon, have invented certain new and useful Improvements in Measuring Instruments; and I do hereby declare the following to be a full, clear, and exact description of the invention, such as will enable others skilled in the art to which it appertains to make and use the same.

This invention relates to measuring instruments.

One object of the invention is to provide an instrument particularly adapted for use by stenographers in their calculations of centering headings for statements, reports, &c.

Another object of the invention resides in the provision of an instrument embodying such characteristics that the measuring of a word will indicate the point of the typewriter scale at which to begin the heading to center the latter with respect to the writing-paper.

With these and other objects in view the present invention consists in the combination and arrangement of parts, as will be hereinafter more fully described, shown in the accompanying drawings, and more particularly pointed out in the appended claim, it being understood that changes in the form, proportion, size, and minor details may be made within the scope of the claim without departing from the spirit or sacrificing any of the advantages of the present invention.

In the drawings, Figure 1 is an elevation of my invention. Fig. 2 is a transverse section through one of the legs, illustrating a portion of the arms.

Referring now to the drawings, it will be seen that the present invention comprises an instrument of the caliper or divider variety including legs 1 and 2, which are pivoted together at one end by means of a suitable pivot-pin 3, the opposite extremities of the legs being beveled into sharp points 4 and 5, respectively, for a purpose hereinafter understood.

Detachably secured by means of a screw 6 in the recess 7, which is formed in the inner face of the leg 2, is a short curved section 9 of a curved arm, to which is pivotally connected, by means of a suitable pivot-pin 10, the outer elongated curved portion 11 of said curved arm. By reason of this sectional formation of the curved arm the instrument may be readily folded, whereby storing of the instrument or carrying of it in the pocket is made convenient. The leg 1 is provided with a slot 12, through which the sections 9 and 11 of the said curved arm may project, there being an opening 13 formed in one face of the leg 1 and communicating with the aforesaid slot 12, so that the scales A and B of the curved arm may be seen from the front of the instrument through said opening. The curved arm is provided with lower and upper scales A and B. It will thus be seen that I provide said arm with two separate columns of scales. These scales are divided by transverse graduations 14, which graduations serve to divide both upper and lower scales.

In the use of my instrument I obtain the proper scale or measurement by measuring along the scale of the type-writer machine, (not shown,) which spaces are one-tenth of an inch in width, and we will assume that the scale of the type-writer machine is a seventy-space scale. Separate the legs 1 and 2 of the instrument until the total number of letters, spaces, figures, &c., in the copy from which the work is to be made appears in the opening 13, the "A" column giving the total number of such letters, spaces, figures, &c. The scales A and B are so arranged that when the total number of letters, spaces, figures, &c., have appeared in the opening 13 the "B" column or scale will indicate the point of the type-writer scale (not shown) at which to begin to write.

From the foregoing it will be understood that my calculating instrument is arranged for a seventy-space type-writing scale. However, I will state that if the type-writing-machine scale is of a seventy-two-space variety simply add one (1) to the result of the calculation of the instrument; if a seventy-five-space scale add three (3) to said calculation; if an eighty-space scale add five (5) to the result of the calculation; if a ninety-space scale add ten (10) to the result of calculation, and if a one-hundred-and-twenty-space scale add twenty-five (25) to the result of calculation. It will thus be seen that my system of calculation through the instrumentality of my improved instrument is obtained regardless of the variations in the point of a scale of the type-writing machine.

As has been premised in the foregoing, the idea involved herein is to facilitate the work of the stenographer in arranging headings in statements, reports, &c. In other words, if one desired to write the word "Oregon" on the heading of a sheet and wished to get it exactly in the center of the page, leaving an equal space on each side of the word, by the ordinary way the number of letters in the word would have to be counted, which in this case is six, and the deduction of six from the number of spaces on the scale of the type-writer, (which we are assuming is seventy,) and it will be found that sixty-four spaces are left, which spaces divided by two will give thirty-two spaces, the thirty-second space being the space or number to start on in order to get the said word "Oregon" in the center of the page. All this mental calculation is obviated by use of my calculating instrument, it simply being necessary to measure the word, and the figures "32," which figures are in the "B" column, will show in the opening 13 on the "B" column or scale. In the event that the copy from which the work is to be done does not contain the exact size of letters as are on the type-writing machine it is simply necessary to count the number of letters in the word (or if a sentence, count the number of spaces, punctuation-marks, figures as well as the letters) and open the calculating instrument to show that number on the "A" column scale, when the "B" column scale will show the exact number to set the type-writing-machine scale in order to write the word or sentence in the middle of the scale.

While my invention is particularly adapted for use by stenographers, it might be stated that compositors could use my improved instrument to advantage.

What is claimed is—

A device of the kind described comprising legs pivoted together, one of the legs having a slot intermediate its ends and an opening in the face of said leg communicating with said slot, and an arm made up of pivotal sections, having scales on the upper surface, said arm being attached at one end to the other of said legs and with its remaining portion arranged for passage through the said slot and adjacent the opening, whereby the scales on the surface of said arm will be visible through said opening.

In testimony whereof I affix my signature in presence of two witnesses.

VICTOR J. O'CONNOR.

Witnesses:
C. M. REDFIELD,
F. O. MINOR.